(12) United States Patent
Funazaki et al.

(10) Patent No.: US 11,368,041 B2
(45) Date of Patent: Jun. 21, 2022

(54) DISCHARGE CONTROL DEVICE

(71) Applicant: HITACHI ASTEMO, LTD., Hitachinaka (JP)

(72) Inventors: Yoshinobu Funazaki, Hitachinaka (JP); Ryosuke Yokoyama, Hitachinaka (JP); Shinichirou Hida, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/297,108

(22) PCT Filed: Nov. 18, 2019

(86) PCT No.: PCT/JP2019/045006
§ 371 (c)(1),
(2) Date: May 26, 2021

(87) PCT Pub. No.: WO2020/110791
PCT Pub. Date: Jun. 4, 2020

(65) Prior Publication Data
US 2021/0399571 A1 Dec. 23, 2021

(30) Foreign Application Priority Data

Nov. 30, 2018 (JP) ............................... JP2018-225005

(51) Int. Cl.
*H02J 7/34* (2006.01)
*H02M 7/00* (2006.01)
(52) U.S. Cl.
CPC ............. *H02J 7/345* (2013.01); *H02M 7/003* (2013.01)
(58) Field of Classification Search
CPC ............. H02J 7/34; H02J 7/345; H02M 7/003
See application file for complete search history.

(56) References Cited

U.S. PATENT DOCUMENTS

| 2016/0064956 A1* | 3/2016 | Minesawa ................. B60L 7/18 |
| | | 320/166 |
| 2018/0222332 A1* | 8/2018 | Hosaka .................... B60L 53/00 |
| 2018/0358903 A1 | 12/2018 | Takahashi et al. |

FOREIGN PATENT DOCUMENTS

| EP | 3499256 B1 * | 9/2021 | ......... G01R 31/3644 |
| JP | 2000-175458 A | 6/2000 | |

(Continued)

OTHER PUBLICATIONS

International Search Report with English translation and Written Opinion issued in corresponding application No. PCT/JP2019/045006 dated Feb. 18, 2020.

*Primary Examiner* — Jared Fureman
*Assistant Examiner* — Duc M Pham
(74) *Attorney, Agent, or Firm* — Foley & Lardner LLP

(57) ABSTRACT

If a wire is broken at a connecting portion 5a, the connection with a positive electrode wiring 4a is broken and a second discharge circuit 11 is lost. However, a first discharge resistor 6 is connected to a positive electrode wiring 4a, and a first discharge circuit 9 is maintained. If a wire is broken at a connecting portion 5b, the connection with a negative electrode wiring 4b is broken and the second discharge circuit 11 is lost. However, the switching element 7 is connected to the negative electrode wiring 4b via a board wiring 3 and a relay wiring 21, and the first discharge circuit 9 is maintained. If a wire is broken at a connecting portion 5c, the connection with the first discharge resistor 6 is broken and the first discharge circuit 9 is lost, but the second discharge circuit 11 is maintained. When a wire is broken at a connecting portion 5d, the connection between the switching element 7 and the second discharge resistor 10 is maintained at the connecting portion 5b, and the first discharge circuit 9 and the second discharge circuit 11 are maintained. According to the invention, a discharge can be (Continued)

maintained even if a disconnection occurs in a connecting portion with a discharge resistor.

5 Claims, 4 Drawing Sheets

(56) References Cited

FOREIGN PATENT DOCUMENTS

| JP | 2013-201842 A | 10/2013 |
| JP | 2018-098875 A | 6/2018 |
| JP | 2018-207718 A | 12/2018 |

* cited by examiner

DISCHARGE CONTROL DEVICE

TECHNICAL FIELD

The present invention relates to a discharge control device.

BACKGROUND ART

A power conversion device that converts power between DC power and AC power includes a semiconductor module that constitutes an inverter circuit and a capacitor that stores electric charges. Then, when a high-voltage battery and an inverter circuit are electrically disconnected due to repair of the power conversion device or the like, a discharge control device having a discharge resistance for quickly discharging the electric charge stored in the capacitor is provided (PTL 1).

CITATION LIST

Patent Literature

PTL 1: JP 2013-201342 A

Technical Problem

In the above-mentioned device described in PTL 1, discharge cannot be performed when a disconnection occurs in the connecting portion with the discharge resistor.

Solution to Problem

A discharge control device according to the invention includes a capacitor, a positive electrode wiring connected to a positive electrode side of the capacitor, a negative electrode wiring connected to a negative electrode side of the capacitor, a circuit board that has a first connecting portion to a fourth connecting portion, the first connecting portion being connected to the positive electrode wiring and the second connecting portion being connected to the negative electrode wiring, a first discharge resistor that has one end connected to the positive electrode wiring and the other end connected to the third connecting portion of the circuit board, and a relay wiring that connects the fourth connecting portion of the circuit board and the negative electrode wiring. The circuit board includes a second discharge, resistor connected between the first connecting portion and the second connecting portion, a switching element connected between the second connecting portion and the third connecting portion to control conduction/disconnection of the first discharge resistor, and a board wiring for connecting the second connecting portion and the fourth connecting portion.

Advantageous Effects of Invention

According to the invention, a discharge can be maintained even if a disconnection occurs in a connecting portion with a discharge resistor.

DESCRIPTION OF EMBODIMENTS

Comparative Example

Figure 1:
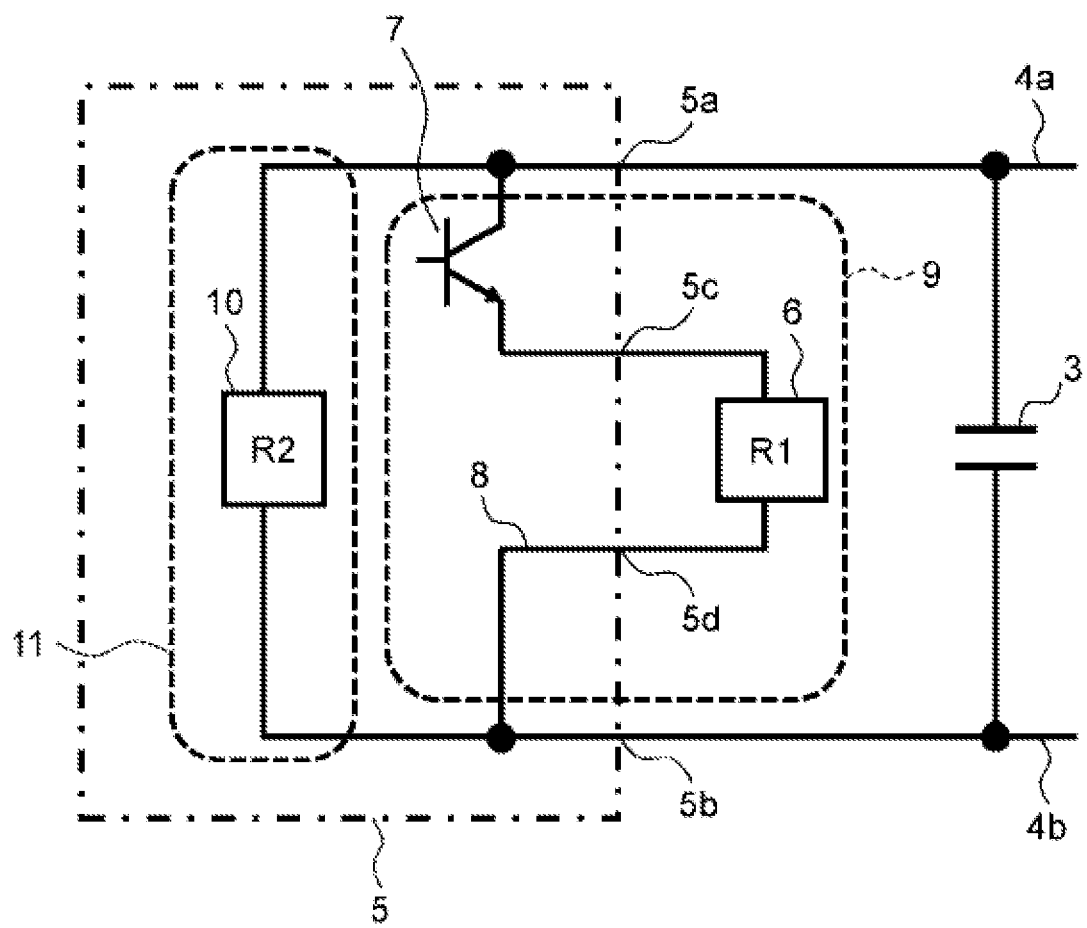
FIG. 1 is a circuit configuration diagram of a discharge control device according to a comparative example.

FIG. 1 is a circuit, configuration diagram of a discharge control device 1 according to a comparative example. This comparative example shows the discharge control device 1 to be compared in explaining this embodiment.

As illustrated in FIG. 1, a capacitor 3 is provided between a positive electrode wiring 4a on the positive electrode side and the inverter circuit side and between the battery side on the negative electrode side and the negative electrode wiring 4b on the inverter circuit side.

The positive electrode wiring 4a and the negative electrode wiring 4b are connected to connecting portions 5a and 5b of a circuit board 5. Further, a first discharge resistor 6 is connected to the outside of the circuit board 5 between a connecting portion 5c and a connecting portion 5d of the circuit board 5. Further, a switching element 7 is connected on the circuit board 5 between the connecting portion 5a and the connecting portion 5c of the circuit board 5. Further, the connecting portion 5d and the connecting portion 5b of the circuit board 5 are connected by a board wiring 8 on the circuit board 5.

The first discharge resistor 6 and the switching element 7 constitute a first discharge circuit 9, and the switching element 7 controls the conduction/interruption of the first discharge resistor 6. When the battery or inverter circuit is electrically disconnected due to maintenance of the device or the like, the switching element 7 is turned on and the electric charge stored in the capacitor 3 is discharged through the first discharge resistor 6.

A second discharge resistor 10 is connected on the circuit board 5 between the connecting portion 5a and the connecting portion 5b of the circuit beard 5. The second discharge resistor 10 detects the voltage of the capacitor 3 by detecting the voltage applied to a part of the resistor, and gradually discharges the electric charge stored in the capacitor 3. That is, the second discharge resistor 10 constitutes a second discharge circuit 11.

Here, if a disconnection occurs in the connecting portion 5a, the connection with the positive electrode wiring 4a is disconnected, and as a result, the first discharge circuit 9 and the second discharge circuit 11 are lost, and the capacitor 3 cannot be discharged. Further, if a disconnection occurs in the connecting portion 5b, the connection with the negative electrode wiring 4b is disconnected, and as a result, the first discharge circuit 9 and the second discharge circuit 11 are lost, and the capacitor 3 cannot be discharged.

If a disconnection occurs in the connecting portion 5c or the connecting portion 5d, the connection with the first discharge resistor 6 is disconnected, and as a result, the first discharge circuit 9 is lost, but the second discharge circuit 11 maintains the state, so that it is possible to discharge the capacitor 3.

In this embodiment described below, the discharge of the capacitor 3 can be maintained even when the connecting portion 5a and the connecting portion 5b are disconnected.

EMBODIMENTS

Figure 2:
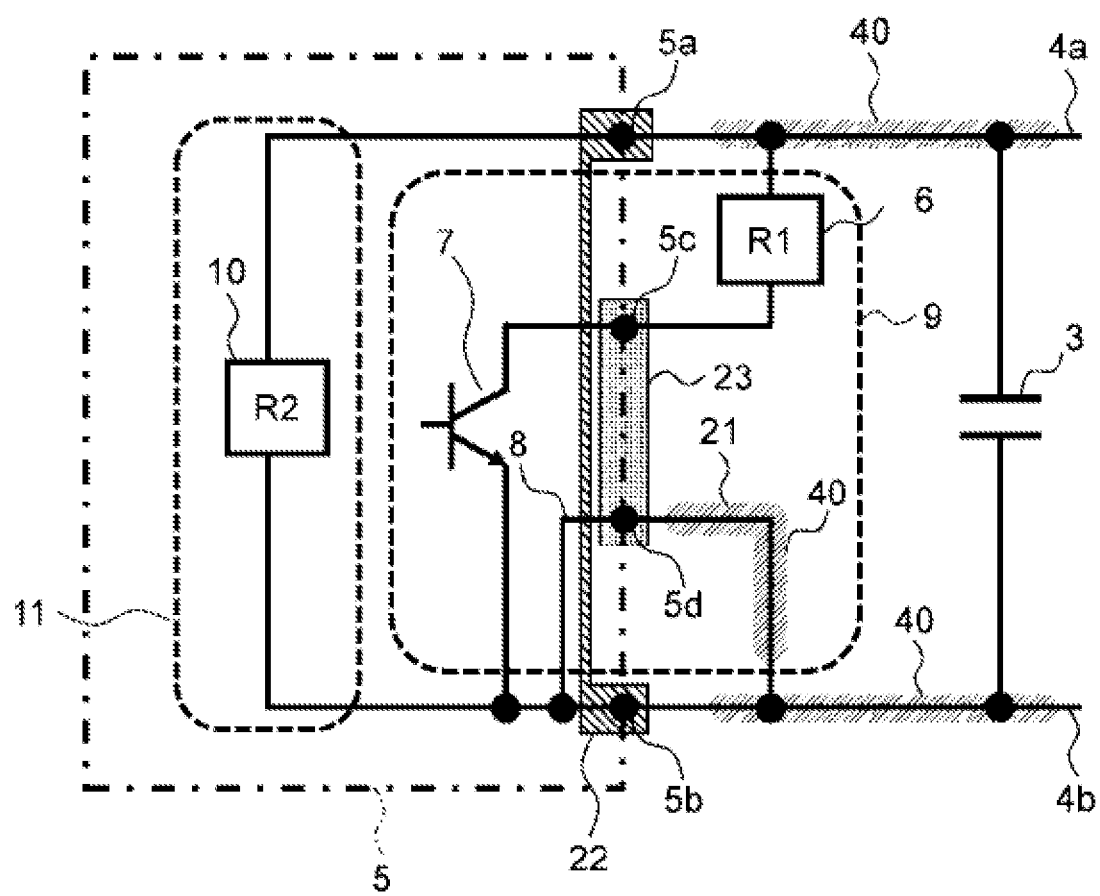
FIG. 2 is a circuit configuration diagram of a discharge control device according to an embodiment.

FIG. 2 is a circuit configuration diagram of a discharge control device 2 according to this embodiment.

As illustrated in FIG. 2, the capacitor 3 is provided between the positive electrode wiring 4a on the positive electrode side and the inverter circuit side and between the battery side on the negative electrode side and the negative electrode wiring 4b on the inverter circuit side.

The positive electrode wiring 4a and the negative electrode wiring 4b are connected to the connecting portions 5a and 5b of the circuit board 5. Further, a first discharge resistor 6 is connected to the outside of the circuit board 5 between the connecting portion 5c and the connecting portion 5a of the circuit board 5. Further, the switching element 7 is connected on the circuit board 5 between the connecting portion 5c and the connecting portion 5b of the circuit board 5. Further, the connecting portion 5d and the connecting portion 5b of the circuit board 5 are connected by the board wiring 8 on the circuit board 5. Further, the connecting portion 5d and the connecting portion 5b of the circuit board 5 are connected by a relay wiring 21 on the outside of the circuit board 5.

Here, the connecting portions 5a and 5b are configured by the first connector 22, and the connecting portions 5c and 5d are configured by a second connector 23. For example, the female side of the first connector 22 is provided in the circuit board 5, the male side of the first connector 22 is configured by the positive electrode wiring 4a and the negative electrode wiring 4b, and the connection points between the female side and the male side of the first connector 22 are the connecting portions 5a and 5b. Similarly, the female side of the second connector 23 is provided in the circuit board 5, the male side of the second connector 23 is connected to the first discharge resistor 6 and the relay wiring 21, and the connection points between the female side and the male side of the second connector 23 are the connecting portions 5c and 5d.

The first discharge resistor 6 and the switching element 7 constitute the first discharge circuit 9, and the switching element 7 controls the conduction/interruption of the first discharge resistor 6. When the battery or inverter circuit is electrically disconnected due to maintenance of the power conversion device or the like, the switching element 7 is turned on and the electric charge stored in the capacitor 3 is discharged through the first discharge resistor 6.

A second discharge resistor 10 is connected on the circuit board 5 between the connecting portion 5a and the connecting portion 5b of the circuit beard 5. The second discharge resistor 10 detects the voltage of the capacitor 3 by detecting the voltage applied to a part of the resistor, and gradually discharges the electric charge stored in the capacitor 3. That is, the second discharge resistor 10 constitutes the second discharge circuit 11.

The positive electrode wiring 4a, the negative electrode wiring 4b, and the relay wiring 21 are arranged in the wiring recesses provided in the back surface of the circuit board 5, other circuit boards, and the housing of the power conversion device, and are sealed by a resin material 40 as described later.

Further, the circuit board 5, the capacitor 3, and the first discharge resistor 6 are housed in a housing (not illustrated) together with a semiconductor module constituting an inverter circuit (not illustrated), and the housing is closed by a lid to be a power conversion device.

Here, if a disconnection occurs in the connecting portion 5a, the connection with the positive electrode wiring 4a is disconnected, and as a result, the second discharge circuit 11 is lost. However, the first discharge resistor 6 is connected to the positive electrode wiring 4a, and the first discharge circuit 9 is maintained, so that it is possible to discharge the capacitor 3. Further, if a disconnection occurs in the connecting portion 5b, the connection with the negative electrode wiring 4b is disconnected, and as a result, the second discharge circuit 11 is lost. However, the switching element 7 is connected to the negative electrode wiring 4b via the board wiring 3 and the relay wiring 21, the first discharge circuit 9 is maintained, so that it is possible to discharge the capacitor 3.

Further, if a disconnection occurs in the connecting portion 5c, the connection with the first discharge resistor 6 is disconnected, and as a result, the first discharge circuit 9 is lost, but the second discharge circuit 11 maintains the state, so that it is possible to discharge the capacitor 3.

If a disconnection occurs in the connecting portion 5d, the connection between the switching element 7 and the second discharge resistor 10 is maintained at the connecting portion 5b, and as a result, the first discharge circuit 9 and the second discharge circuit 11 are maintained, so that it is possible to discharge the capacitor 3.

The first connector 22 constitutes the connecting portions 5a and 5b, and the second connector 23 constitutes the connecting portions 5c and 5d. Here, if a connection failure such as a disconnection occurs in the first connector 22, the second discharge circuit 11 is lost, but the first discharge circuit 9 is maintained by the second connector 23, so that it is possible to discharge the capacitor 3.

On the other hand, if a connection failure such as disconnection occurs in the second connector 23, the first discharge circuit 9 is lost, but the second discharge circuit 11 is maintained by the first connector 22, so that it is possible to discharge the capacitor 3.

Figure 3:
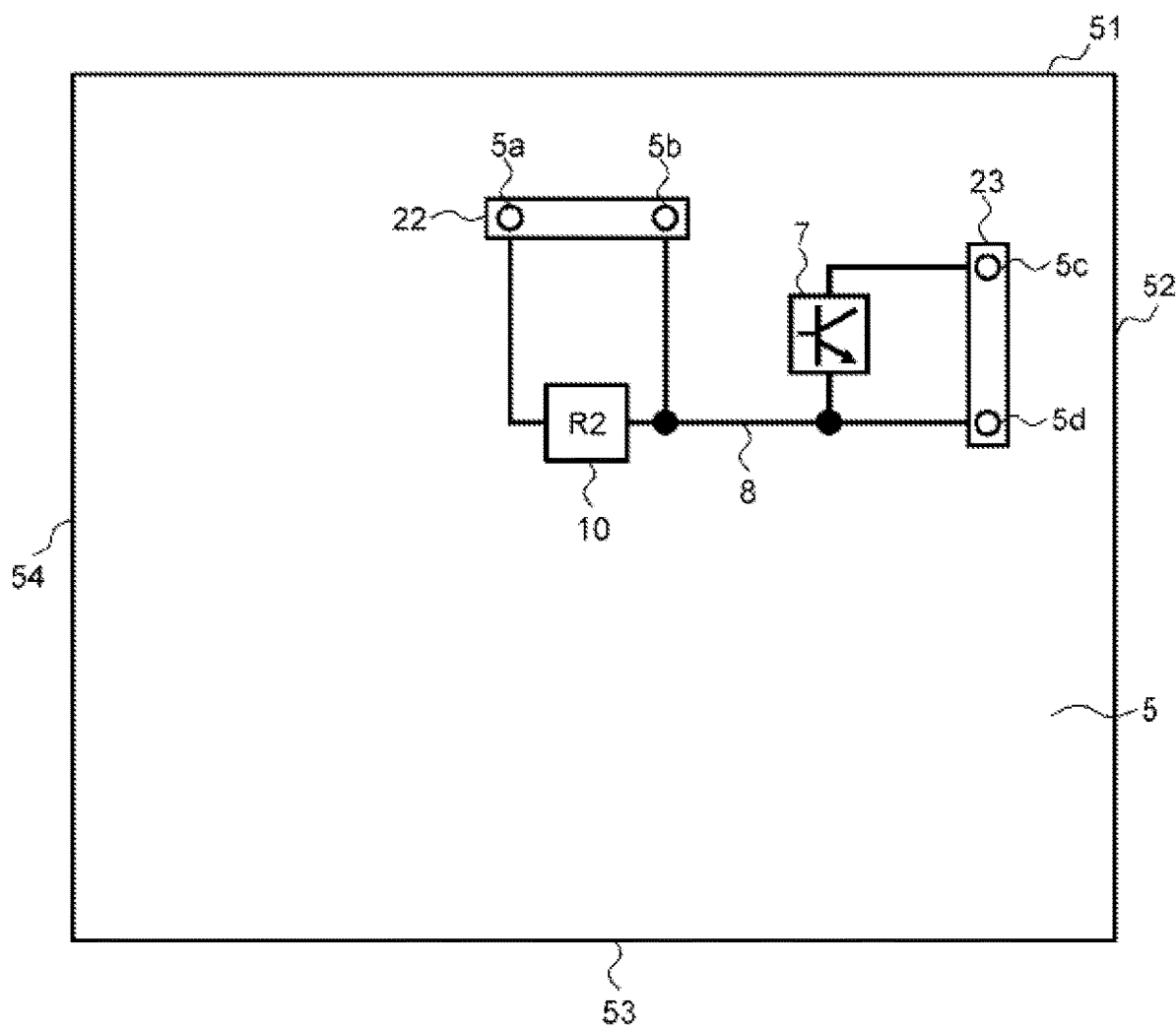
FIG. 3 is a diagram illustrating an arrangement state of a first connector and a second connector on a circuit board.

FIG. 3 is a diagram illustrating an arrangement state of the first connector 22 and the second connector 23 on the circuit board 5.

As illustrated in FIG. 3, the first connector 22 and the second connector 23 are arranged on different sides of the circuit board 5 among four sides 51 to 54, for example, in the vicinity of the sides 51 and 52, respectively. The second discharge resistor 10 is connected between the connecting portion 5a and the connecting portion 5b of the first connector 22. The switching element 7 is connected between the connecting portion 5c and the connecting portion 5d of the second connector 23. The connecting portion 5d and the connecting portion 5b are connected by the board wiring 3 on the circuit board 5.

Both the first connector 22 and the second connector 23 are important elements in forming the first discharge circuit 5 and the second discharge circuit 11, and the risk of both the first connector 22 and the second connector 23 being disconnected at the same time can be minimized by separating their arrangement positions and orientations on the circuit board 5.

Figure 4:
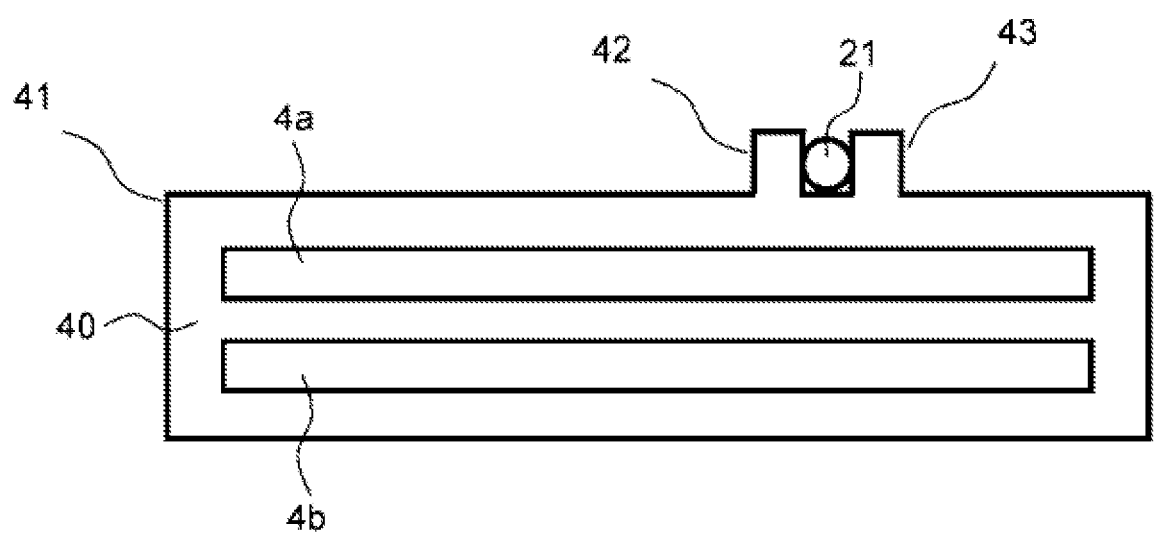
FIG. 4 is a cross-sectional view illustrating an installation state of wiring.

FIG. 4 is a cross-sectional view illustrating the installation state of the wiring. The positive electrode wiring 4a and the negative electrode wiring 4b, which are bus bars, are laminated and arranged at intervals, and are sealed with an insulating resin material 40 to form a bus bar structure 41. Protrusions 42 and 43 are integrally provided in the surface of the bus bar structure 41 by the insulating resin material 40 so as to face each other, and the relay wiring 21 is locked between the protrusions 42 and 43. The protrusions 42 and 43 may be provided not only in the surface of the bus bar structure 41 but also in a circuit board such as the circuit board 5 or the housing of the power conversion device. As a result, it is possible to prevent the relay wiring 21 from coming into contact with peripheral parts due to vibration or the like, or to prevent the contact portion from being worn and broken.

According to the above embodiment, the following operational effects are obtained.

(1) The discharge control device 2 includes a capacitor 3, a positive electrode wiring 4a connected to a positive electrode side of the capacitor 3, a negative electrode wiring 4b connected to a negative electrode side of the capacitor 3, a circuit board 5 that has first to fourth connecting portions 5a to 5d, the first connecting portion 5a being connected to the positive electrode wiring 4a and the second connecting portion 5b being connected to the negative electrode wiring 4b, a first discharge resistor 6 that has one end connected to the positive electrode wiring 4a and the other end connected to the third connecting portion 5c of the circuit board 5, and a relay wiring 21 that connects the fourth connecting portion 5d of the circuit board 5 and the negative electrode wiring 4b. The circuit board 5 includes a second discharge resistor 10 connected between the first connecting portion 5a and the second connecting portion 5b, a switching element 7 connected between the second connecting portion 5b and the third connecting portion 5c to control conduction/disconnection of the first discharge resistor 6, and a board wiring 3 for connecting the second connecting portion 5b and the fourth connecting portion 5d. As a result, the discharge can be maintained even if the connection with the discharge resistor is disconnected.

The invention is not limited to the above embodiments, and includes other forms considered within the scope of the technical ideas of the invention as long as the features of the invention are not degraded.

REFERENCE SIGNS LIST 1, 2 discharge control device
3 capacitor
4a positive electrode wiring
4b negative electrode wiring
5 circuit board
5a, 5b, 5c, 5d connecting portion
6 first discharge resistor
7 switching element
8 board wiring
9 first discharge circuit
10 second discharge resistor
11 second discharge circuit
21 relay wiring
22 first connector
23 second connector
40 resin material
41 bus bar structure
42, 43 protrusion

The invention claimed is:

1. A discharge control device, comprising:
a capacitor;
a positive electrode wiring connected to a positive electrode side of the capacitor;
a negative electrode wiring connected to a negative electrode side of the capacitor;
a circuit board that has a first connecting portion to a fourth connecting portion, the first connecting portion being connected to the positive electrode wiring and the second connecting portion being connected to the negative electrode wiring;
a first discharge resistor that has one end connected to the positive electrode wiring and the other end connected to the third connecting portion of the circuit board; and
a relay wiring that connects the fourth connecting portion of the circuit board and the negative electrode wiring,
wherein the circuit board includes a second discharge resistor connected between the first connecting portion and the second connecting portion, a switching element connected between the second connecting portion and the third connecting portion to control conduction/disconnection of the first discharge resistor, and a board wiring for connecting the second connecting portion and the fourth connecting portion.

2. The discharge control device according to claim 1, comprising:
a first connector that performs connection of the first connecting portion and connection of the second connecting portion; and
a second connector that performs connection of the third connecting portion and connection of the fourth connecting portion.

3. The discharge control device according to claim 2, wherein the first connector and the second connector each are arranged in a vicinity of different sides of four sides of the circuit board.

4. The discharge control device according to claim 1, wherein the positive electrode wiring and the negative electrode wiring are sealed with a resin material.

5. The discharge control device according to claim 1, wherein the relay wiring is locked with a resin material.

\* \* \* \* \*